W. HEATON.
Shelter for Animals.
No. 202,648. Patented April 23, 1878.
Fig: 3.
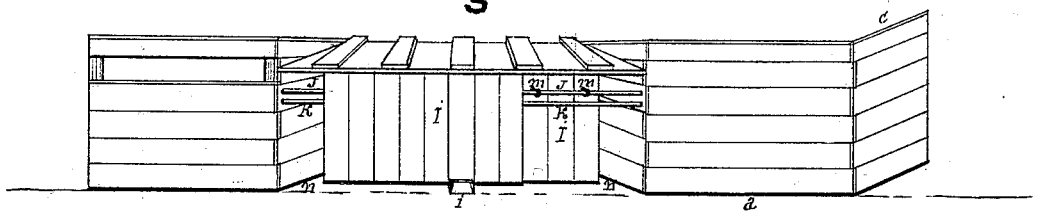
Fig: 2.
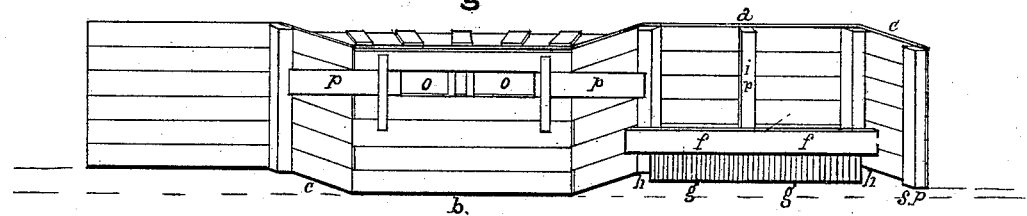
Fig: 1.
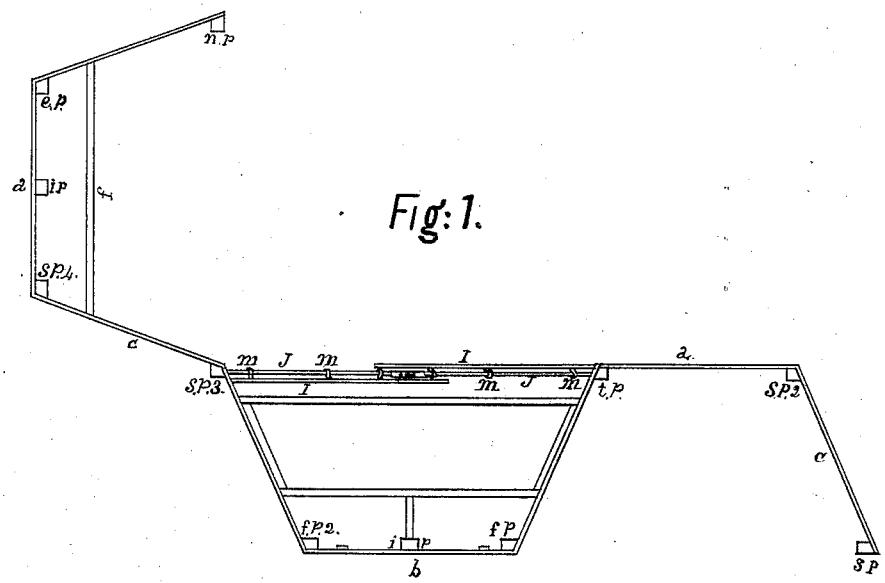
WITNESSES.
INVENTOR,
William Heaton,
Per John S. Gallaher jr.
Attorney.

2 Sheets—Sheet 2.
W. HEATON.
Shelter for Animals.
No. 202,648. Patented April 23, 1878.
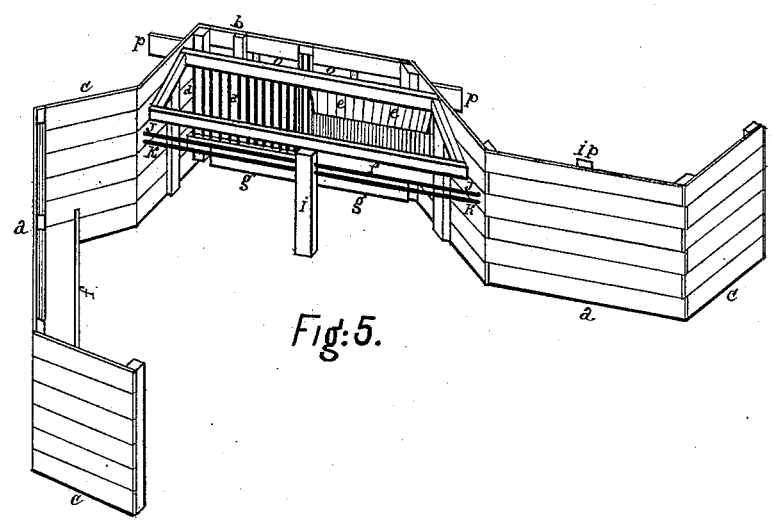
Fig:5.
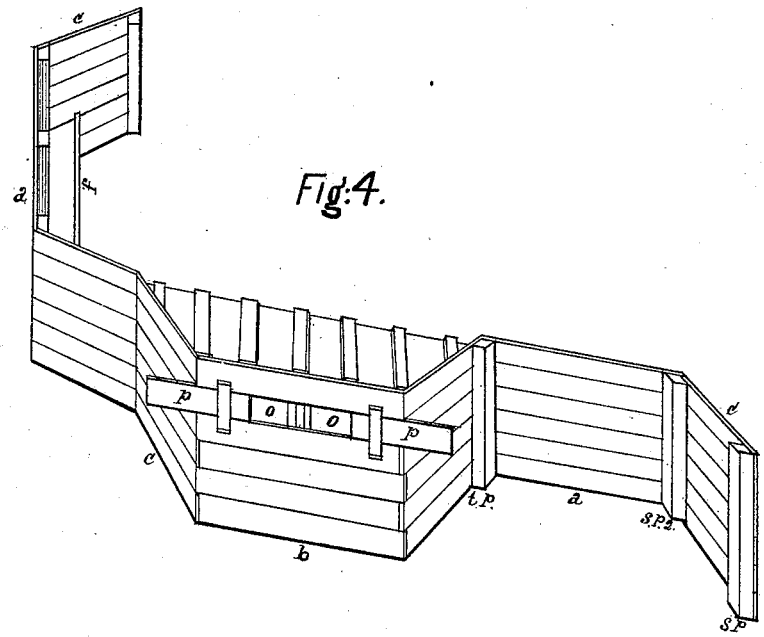
Fig:4.
WITNESSES.
S. S. Densmore
M. A. Gallaher
INVENTOR.
William Heaton,
Per John S. Gallaher jr.
Attorney.

UNITED STATES PATENT OFFICE.

WILLIAM HEATON, OF LEE TOWNSHIP, MADISON COUNTY, IOWA.

IMPROVEMENT IN SHELTERS FOR ANIMALS.

Specification forming part of Letters Patent No. 202,648, dated April 23, 1878; application filed December 10, 1877.

*To all whom it may concern:*

Be it known that I, WILLIAM HEATON, of Lee township, in the county of Madison and State of Iowa, have invented a new and useful improvement, which I designate as a Cattle-Shield or Animal-Protector from the Weather, of which the following is a specification:

The nature of my improvements consists in constructing a cattle shield or protector with a series of semi or half hexagonal formations, as shields and sheds, arranged and situated relatively in their shape and construction to the several points of the compass; the object of which is to shelter and protect animals from the driving force and blasts of wind and storm to which they may be exposed more or less when feeding in herds on prairie lands or in bleakly exposed or mountainous regions of country.

To enable others to construct and use my said improvements, the following is a description thereof, with a reference to the accompanying drawings, which, however, show only a section or portion thereof, the entire structure being erected within an inclosure of ground or field.

Figure 1 represents a ground plan and view with top detached, showing interior framing. Fig. 2 represents an outside front elevation. Fig. 3 represents an inside elevation. Fig. 4 represents an outside perspective view. Fig. 5 represents a perspective interior view.

Each figure has similar letters and numbers, indicating like parts.

Having selected the desired locality, convenient for sheltering and feeding, take suitable posts or uprights of sufficient size, (ten feet long,) and dressed or undressed boarding of suitable thickness, and from twelve to sixteen feet (more or less) in length, as available, and proceed as follows, viz: Plant a starting-post, $s\,p$, Figs. 1, 2, 4, in the ground, twenty-four inches, (more or less,) according to compactness of soil; then mark off or plat out the ground or space to be occupied by the structure; then from the starting-post, at the required distance, suited to length of boarding to be used, plant a second post, $s\,p^2$, at an angle of twenty degrees west of north, or east or south, as may suit; then plant a third post, $t\,p$, at the same distance, in a line due west; then plant a fourth post, $f\,p$, at the same distance from the third post, at an angle of twenty degrees west of south; then plant a fifth post, $f\,p^2$, at the same distance apart from the fourth post, in a direct line due west; then, at same distance from the fifth post, plant a sixth post, $s\,p^3$, at an angle of twenty degrees west of north; then, at the required distance, plant a seventh post, $s\,p^4$, at an angle of twenty degrees north of west; then, at required distance, plant an eighth post, $e\,p$, in a line due north; then, at required distance, plant a ninth post, $n\,p$, at an angle of twenty degrees in a northeasterly direction, and so on, proceeding in the desired direction until the required extent of shields and sheds is erected, not making an entirely inclosed structure, but leaving an opening or space enough at one point, so that the animals can readily seek either the inside or outside of the structure, as the weather may prompt them. The structure may extend in length and width as deemed requisite for the size of the herd or gang of cattle to be sheltered.

If required, intermediate post $i\,p\,i\,p$, Figs. 1, 2, 5, can be planted, to stiffen the several panels.

The series of posts are planked or boarded up, as shown in Figs. 2, 3, 4, 5, as high as the length of the posts permits, and each shed must be roofed over with planking in any secure suitable manner, as in Figs. 2, 3, 4.

In the several figures, at $a\,a\,b$, it will be seen that the shields or sheds alternate in and out—that is to say, the broad front of one faces in an opposite direction to the adjoining one east and west, north and south, so that the animals seeking shelter can always be protected, no matter from what direction a storm may prevail. Each shield or shed $a\,a\,b$ must be provided with suitable rafters, studs, and bracings for racks and troughs, as shown in Figs. 1, 5. Within each shield or shed, against the narrow end $b$, Fig. 5, must be constructed a suitable feed-rack, as indicated by the dark vertical bars $d\,d$, for long feed, and a grain-hopper, $e\,e$, for shelled food, beneath all of which is located a feed-trough, $f\,f$, rising thirty inches high (more or less) from the ground, and from two to three feet wide, (more or less,) and of suitable depth, said trough having a front board or riser, $g\ g$, of length sufficient to afford suitable spaces or openings, $h\ h$, Fig. 2, at each end, for ingress and egress of swine, thus affording the double purpose of cattle-trough and shelter for swine, which are generally found useful in following cattle, to consume the loose grain and waste more or less consequent upon feeding animals in large numbers.

Midway of the distance or wider space on the inside front is planted a suitable central stud or upright, $i\ i$, Figs. 1, 3, 5, and horizontally across from side to side of said wider space, at convenient and proper height, are affixed securely one or more strong rods or ways, $J\ J\ K\ K$, Figs. 1, 3, 5, upon which are hung suitably-constructed sliding doors $l\ l$, slightly less than the width or height of the space from the ground to the eaves of the roof, said doors being sufficiently long horizontally, and having suitable strong suspension hooks or staples, $m\ m$, (shown in Figs. 1 and 3,) inserted on the inner side of each door, by which hooks or staples the doors are hung or suspended upon the horizontal bars or ways $J\ J\ K\ K$, as shown in Figs. 1 and 3, each door sliding or folding outside the other, and moving inwardly from right to left toward the central stud or upright $i\ i$, so that when both doors are overlying each other, or are slid inwardly, there shall be an opening, $n\ n$, Fig. 3, at the end of each door next to the oblique sides of the shield or sheds, of sufficient width and height to afford ingress and egress of the animals to be sheltered. The sliding doors $l\ l$ are long enough, when slid outwardly, to entirely close up the whole space, making the shields or sheds entirely closed when desired, as shown in Fig. 1.

In boarding up the structure, suitable openings, $o\ o$, Figs. 2, 4, 5, must be left for ventilation, and provided with sliding panels $p\ p$, said openings answering also for inlets through which to deposit from wagons or carts on the outside long feed and grain in the racks $d\ d$ and hoppers $e\ e$, Fig. 5.

My invention is suitable for all kinds of farm and grazing animals; and the several advantages pertaining thereto consist, first, in making the structure with the peculiar semi-hexagonal-shaped shields or sheds, alternating in and out, as shown at $a\ b$, Figs. 1, 2, and 4, whereby great strength and permanency of structure are obtained in a ready, cheap, and simple manner, and the force of broad, sweeping blasts of wind and storms is broken and guarded against from any and every direction they may come; secondly, by the peculiar form of construction, animals may be housed and fed in small gangs or herds within large, extensive inclosures, without crowding or jamming, and greatly preventing the more vicious animals from doing injury to others, by cornering, goring, or kicking, as often occurs with horned cattle and kicking animals when huddled promiscuously together; thirdly, in the ready protection afforded the animal seeking shelter, whose instinct prompts it to seek the west side of the shield if the storm comes from the east, or the south side if the storm comes from the north, and vice versa.

In the erection of my invention I do not, however, confine myself or limit the construction to any fixed or specific angle or oblique-sided shield or shed, as material and location may require more or less variation from the configuration herein described.

I am aware that in the patent of D. M. Denison of April 11, 1871, there is shown what are termed "reversed stalls," which are used as compartments for single individual animals, and said stalls are employed in the interior of a stable, which is used as an additional shelter or auxiliary inclosure or housing; but such features of construction and arrangement do not pertain to my shield, which is designed for sheltering and feeding animals in gangs or small herds on prairies or field-inclosures.

I am also aware that the patents of Joseph M. Spencer of April 29, 1873, of Collins and Miles of January 20, 1874, and of A. W. Prather of July 10, 1877, all show the several features of feed-rack, trough, and hog-shelter; but in no one of said patents is found all of the peculiar construction and combination shown in my improvements. Therefore,

What I claim, and desire to have secured by Letters Patent, is as follows, viz:

The improved animal shield or shelter having sides $a\ b\ c$, arranged as described, to form sheds alternating in and out, and of a semi or half hexagonal shape, and provided with the feed-racks $d\ d$, grain-hopper $e\ e$, feed-trough $f\ f$, swine-shelter $h\ h$, the double ways or rods $J\ K$, and double sliding suspended doors $l\ l$, substantially as specified.

WILLIAM HEATON.

Witnesses:
JAMES W. CAMPBELL,
PETER KELLY.